United States Patent Office.

FRANKLIN B. GAGE, OF ST. JOHNSBURY, VERMONT.

*Letters Patent No.* 66,581, *dated July* 9, 1867.

---

PROCESS FOR MAKING POSITIVE AND NEGATIVE PHOTOGRAPHS IN THE CAMERA.

---

*The Schedule referred to in these Letters Patent and making part of the same.*

---

TO ALL PERSONS TO WHOM THESE PRESENTS SHALL COME:

FRANKLIN B. GAGE, of St. Johnsbury, in the county of Caledonia, and State of Vermont, sends greeting.

Be it known that I, FRANKLIN B. GAGE, have invented a new and useful Improvement in Photography, and that the same is specified in the words following, to wit:

By the usual manner of producing photographic impressions, when the invisible impression is formed in the camera it is removed in a dark room, and at once developed or rendered visible by means of solutions or analogous ponderable agents. I employ, on the contrary, what may be termed a partial development in the camera, by the aid of diffused light. The development is afterwards completed in the usual way, taking the precaution to reduce the strength of the developing fluid with water.

I will now proceed to describe what I consider the best manner of proceeding, so that those skilled in the art may be able to understand and use my invention with success.

I proceed to take a photographic impression in the manner usually employed. Then I place some plain, dark, dead surface in front of the camera, the sensitive surface still remaining in the camera. I then remove the covering from the lens tube and expose the sensitive surface, on which the impression has been formed, to the light reflected from the dark surface, while the dark surface is kept in gentle motion, so as to prevent the sensitive surface from taking an impression of any wrinkles or other variations on the surface from which the light is reflected. The time of this exposure must be varied according to the amount of light reflected, and the effect it is desirable to produce. The usual amount of time occupied in this exposure will be from one-fourth to double the time employed in taking the invisible impression. But in some cases it can be extended much beyond this time. For a dark, dead surface I usually use a piece of thick, black woollen cloth, about eighteen (18) inches square, attached by one edge to a stick about two (2) feet long, which I hold horizontally, and gently move in front of the camera with the left hand, while I uncover the lens tube with the right hand.

It is not absolutely essential that this dark surface be kept in motion, but it is safer. This exposure of the sensitive surface to light reflected from a dark dead surface apparently leaves the lightest portions of the impression but little changed, while it effects a much greater change in the darkest portions of the same, and thus harmonizes and properly blends the two, giving to the whole an atmospheric effect never before realized in photographic impressions. It also renders it less difficult to obtain the necessary intensity in negatives.

It will be understood that my invention applies equally well and is operated in the same manner in taking positives or negatives in the camera. I believe that it may be used without further instructions in producing any style of photographic pictures. It is necessary that the dead surface be suitably lighted and the time of exposure proportioned to the result desired to be produced. I believe that the best results are produced when the dead surface is as strongly lighted as possible without sunlight, using a diaphragm to reduce the aperture of the lens to prevent the development being so rapid as to become unmanageable. I have produced excellent results with a silver bath of twenty grains of nitrate of silver to the ounce of water, being about one-half the usual strength in use, the sensitizing of the collodion being proportionally reduced. I believe it will effect a great saving of expense for this reason.

I believe my invention also removes the most important obstacle to the production of dry-plate impressions by harmonizing the lights and shades, which have heretofore usually been hard and inartistic. Exposing the sensitive surface in the manner described, before the impression has been formed, has less tendency to blend the lights and shades than when done afterwards, but I believe it gives a different and peculiar tone to the impression, which, in some cases, is very desirable, especially in negatives. When the object to be impressed is strongly lighted, accompanied with deep, heavy shadows, it is found advisable to illuminate, in the manner described, the sensitive surface, both before and after the impression is formed. This is effected by moving the black cloth before the camera a short time, before as well as after, and operating otherwise in the same manner as before described.

Light dead surfaces may be used to produce a similar result, but their use is attended with greater hazard; and I believe the result obtained from dark surfaces is always to be preferred. I believe, also, that some glossy surfaces even may be used for this purpose, but require greater care to insure desirable effects. I believe that some good effect may be produced by admitting transmitted light upon the sensitive surface, or again, light reflected from yellow, and even red, and other colored surfaces, either before or after, or both before and after the photographic impression has been formed, but I believe that the reflection from a dark dead surface is much to be preferred, and have described a method of operating which I have found perfectly convencint and practical for use. The dead surface may be placed in the exact focus of the lens if the surface be kept in motion, so as to produce no distinct impression of its porous structure and inequalities, but it is neither as safe nor convenient as when the surface is out of focus.

Having now fully described my invention, what I claim as new, and desire to secure by Letters Patent, is as follows:

I claim in photography the employment of diffused light, under the conditions herein specified, so as to render visible slight gradations of shade, both in the light and dark parts of the pictures, and to unite softness with strength, as herein explained and set forth.

In testimony that the above is a true specification of my said improvement as above described, I hereunto set my hand and seal this 11th day of March, A. D. 1867.

FRANKLIN B. GAGE. [L. S.]

Witnesses:
JONATHAN RUSS,
ELISHA MAY.